United States Patent
Yoshida

(10) Patent No.: US 7,916,692 B2
(45) Date of Patent: Mar. 29, 2011

(54) MOBILE COMMUNICATION SYSTEM, EDGE ROUTER, AND TRANSFER CONTROL METHOD, PROGRAM AND RECORDING MEDIUM USED THEREFOR

(75) Inventor: Kaoru Yoshida, Minato-ku (JP)

(73) Assignee: NEC Corporation, Tokyo (JP)

( * ) Notice: Subject to any disclaimer, the term of this patent is extended or adjusted under 35 U.S.C. 154(b) by 852 days.

(21) Appl. No.: 11/817,273

(22) PCT Filed: Nov. 22, 2005

(86) PCT No.: PCT/JP2005/021433
§ 371 (c)(1),
(2), (4) Date: Aug. 28, 2007

(87) PCT Pub. No.: WO2006/103805
PCT Pub. Date: Oct. 5, 2006

(65) Prior Publication Data
US 2009/0052410 A1 Feb. 26, 2009

(30) Foreign Application Priority Data

Mar. 25, 2005 (JP) .................................. 2005-088610

(51) Int. Cl.
*H04J 1/16* (2006.01)
*H04L 12/56* (2006.01)
(52) U.S. Cl. ......... 370/329; 370/389; 370/401; 370/430
(58) Field of Classification Search .................. 370/328, 370/329, 389, 401, 331, 430
See application file for complete search history.

(56) References Cited

U.S. PATENT DOCUMENTS

| 7,649,866 B2* | 1/2010 | Chari et al. | 370/331 |
| 2006/0140164 A1* | 6/2006 | Patel et al. | 370/338 |

FOREIGN PATENT DOCUMENTS

JP 2002-271377 A 9/2002

(Continued)

OTHER PUBLICATIONS

K. Nishida, et al., "Implementation and evaluation of a network-controlled mobility management protocol", In: Wireless Communications and Networking Conference, 2005 IEEE, Mar. 17, 2005, vol. 3, ISBN 0-07803-8966-2, pp. 1402 to 1408.

(Continued)

*Primary Examiner* — John Pezzlo
(74) *Attorney, Agent, or Firm* — Sughrue Mion, PLLC

(57) ABSTRACT

The present invention aims to provide continuous communication, between mobile terminal, based on edge mobility technology, during hand over a mobile terminal, even if addresses of edge routers before/after movement of the mobile terminal may not be acquired from the mobile terminal. It is configured so that when the mobile terminal moves, it becomes connected to the edge router and a CN information request command is transmitted to a home agent. The home agent manages a care-of address corresponding to a home address of the mobile terminal and transmits the CN information request command to this care-of address, which corresponds to the edge router before the mobile terminal moves, and the edge router manages a care-of address of a communication partner of the mobile terminal. Therefore, the care-of address of the communication partner of the mobile terminal can be acquired.

15 Claims, 10 Drawing Sheets

FOREIGN PATENT DOCUMENTS

| | | |
|---|---|---|
| JP | 2004-112727 A | 4/2004 |
| JP | 2004-129210 A | 4/2004 |
| JP | 2004-328762 A | 11/2004 |
| JP | 2004-533790 A | 11/2004 |
| JP | 2005-26941 A | 1/2005 |
| JP | 2005-27314 A | 1/2005 |
| JP | 2005-33469 A | 2/2005 |

OTHER PUBLICATIONS

R. Koodli, "Fast Handovers for Mobile IPv6", [online], Oct. 25, 2004, IETF, [retrieved on Dec. 13, 2005], Retrieved from the Internet: URL:http://ietfreport.isoc.org/all-ids/draft-ietf-mipshop-fast-mipv6-03.txt, Chapter 3.3.

* cited by examiner

Fig. 7

CN information request command/Packet

CN information request command
ER3→HA1 a | HoA1 | ER3 | Type, HoA1, ER3 |

HA1→ER1 b | CoA1 | HA1 | HoA1 | ER3 | Type, HoA1, ER3 |

Encapsulation and transfer by HA

CN information request acknowledgement
ER1→ER3 c | ER3 | ER1 | Type, HoA1, code, 1.(HoA2, CoA2) |

CN information request acknowledgement
(without registration)
HA1→ER3 d | ER3 | HA1 | Type, HoA1, code(note) |

Note:code indicating that registration is not made

Fig. 8B

| Address of mobile terminal | | Address of communication partner | |
|---|---|---|---|
| Home address | Care-of address | Home address | Care-of address |
| HoA1 | CoA3 | HoA2 | CoA2 |
| . | . | . | . |
| . | . | . | . |
| . | . | . | . |

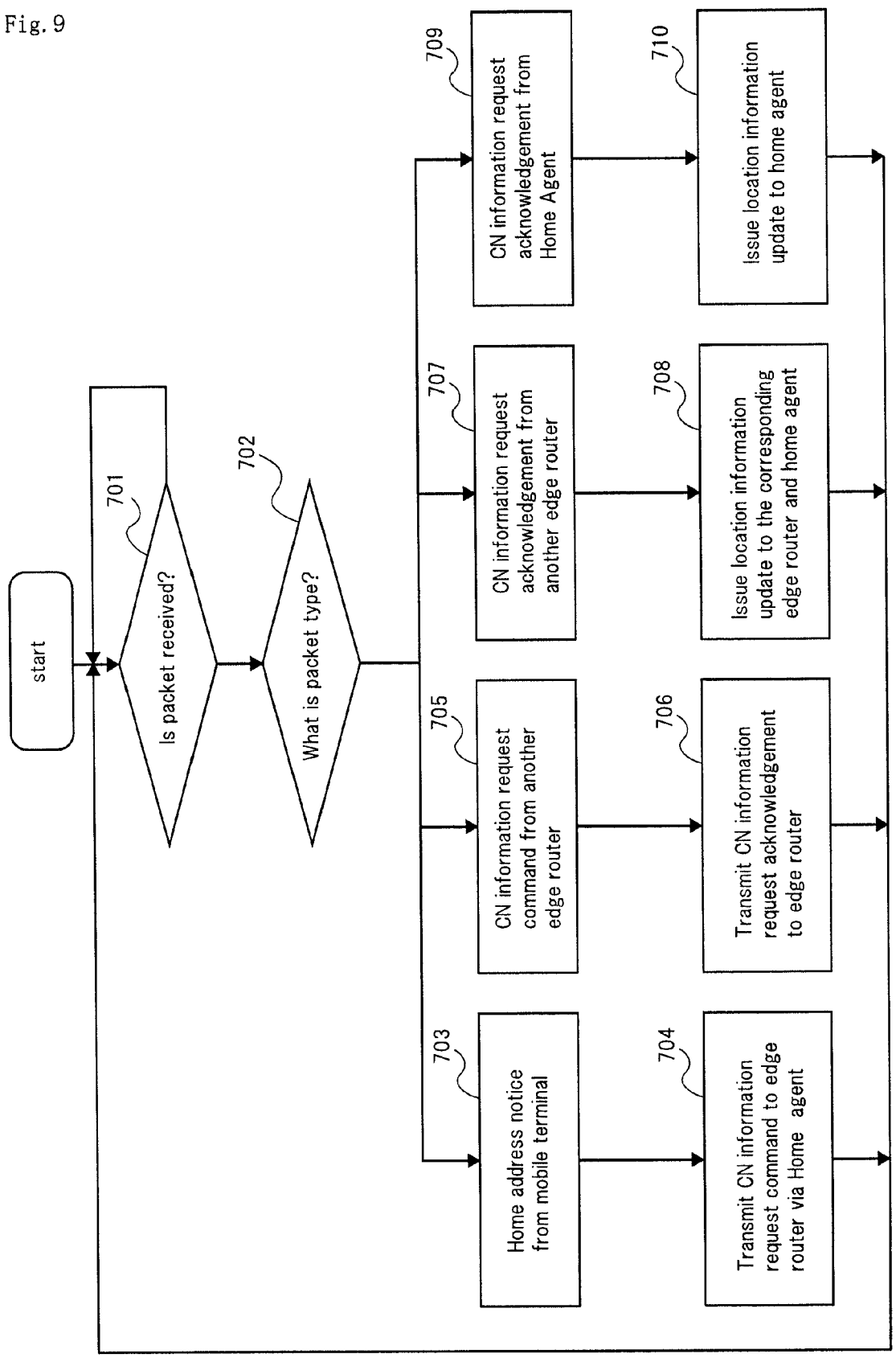

US 7,916,692 B2

MOBILE COMMUNICATION SYSTEM, EDGE ROUTER, AND TRANSFER CONTROL METHOD, PROGRAM AND RECORDING MEDIUM USED THEREFOR

TECHNICAL FIELD

The present invention relates to a mobile communication system, an edge router, and a transfer control method, a program and a recording medium used therefore, and in particular to a mobile communication system according to IP (Internet Protocol), an edge router, and a transfer control method, a program and a recording medium used therefore.

RELATED ART

As mobile communication technologies, recently, have progressed, Mobile IPv6 standardization has been promoted by IETF (Internet Engineering Task Force).

FIG. 1 is a view showing one example of a configuration of a conventional mobile communication system according to Mobile IPv6.

As shown in FIG. 1, in this conventional example, two home agents 130a, 130b having home core networks 131a, 131b, respectively are provided, and communication using an IP packet, sent and received, is made between mobile terminal 110a whose transfer information is managed by the home agent 130a, and mobile terminal 110b whose transfer information is managed by home agent 130b. Mobile terminal 110a is located in access network 121a controlled by edge router 120a, and mobile terminal 110b is located in access network 121b controlled by edge router 120b. In addition, the mobile terminals 110a, 110b each have a home address (HoA: Home Address) that forms a unique IP address, and this home address (HoA) is registered in home agents 130a, 130b, respectively.

Now, a communication method between two mobile terminals 110a, 110b in the mobile communication system shown in FIG. 1 will be described hereinafter.

First, location registration processing of the mobile terminal 110a, 110b will be described.

When mobile terminal 110a moves from home core network 131a or another access network under control of home agent 130a to access network 121a under control of edge router 120a, then, first, in mobile terminal 110a, a care-of address (CoA: Care-of address) that forms an IP address after movement is created using a prefix of an IP address of edge router 120a and a MAC address of mobile terminal 110a, and a combination of the home address of mobile terminal 110a and this care-of address is sent to home agent 130a to make a location registration request (BU: Binding Update). Further, also in mobile terminal 110b, similarly, using the home address of mobile terminal 110b and a care-of address created in access network 121b, the location registration request (BU) to the home agent 130b is carried out.

In home agent 130a which received the location registration request (BU) from mobile terminal 110a, after its validity is confirmed, the home address and the care-of address transmitted from the mobile terminal 110a are associated with each other, the location is registered in a binding cache (BC: Binding Cache) in home agent 130a, and a location registration acknowledgement (BA: Binding Acknowledgements) indicating completion of the location registration is transmitted to mobile terminal 110a. Further, also in home agent 130b, in a similar way, the location of mobile terminal 110b is registered, and the location registration acknowledgement (BA) is transmitted to mobile terminal 110b.

In this way, in home agents 130a, 130b, each of the locations where mobile terminals 110a, 110b are currently located are managed, thereby transfer information of mobile terminals 110a,110b is managed.

Next, processing, in communication between mobile terminals 110a, 110b provided by transmitting and receiving an IP packet after the location registration processing described above is carried out, will be described by showing an example in which an IP packet is transmitted from mobile terminal 110a to mobile terminal 110b. In addition, in the following description, home addresses of mobile terminals 110a, 110b are called "HoA1", "HoA2", respectively, and also care-of addresses of mobile terminals 110a, 110b are called "CoA1", "CoA2".

When mobile terminal 110a transmits an IP packet to a communication partner terminal (CN: Correspondent Node), i.e. the mobile terminal 110b, then, first, in mobile terminal 110a, an IP packet having an internal transmission source address of "HoA1" and an internal destination address of "HoA2" is encapsulated into an IP packet having an external transmission source address of "CoA1" and an external destination address of an IP address of "HA1" of home agent 130a, and this encapsulated IP packet is transmitted from mobile terminal 110a.

Because the IP packet transmitted from mobile terminal 110a has a destination address of the IP address of "HA1" of home agent 130a, it is delivered to home agent 130a through edge router 120a. When the IP packet transmitted from mobile terminal 110a is received by home agent 130a, the received IP packet is decapsulated and an IP packet having a transmission source address of "HoA1" and a destination address of "HoA2" is transmitted.

Because the IP packet transmitted from home agent 130a has the destination address of "HoA2", it is delivered to home agent 130b. When the IP packet transmitted from home agent 130a is received by home agent 130b, then, with reference to the binding cache (BC) in home agent 130b, the care-of address of "CoA2" of mobile terminal 110b for which the IP packet is destined is recognized, and the received IP packet is encapsulated into an IP packet having an external transmission source address of the IP address of "HA2" of home agent 130b and an external destination address of "CoA2", and this encapsulated IP packet is transmitted from home agent 130b.

Because the IP packet transmitted from home agent 130b has the external destination address of "CoA2", it is delivered to mobile terminal 110b having the care-of address of "CoA2" through edge router 120b. When the IP packet transmitted from the home agent 130b is received by mobile terminal 110b, the received IP packet is decapsulated and the IP packet having the transmission source address of "HoA1" and the destination address of "HoA2" is received.

In this way, the locations where mobile terminals 110a, 110b are currently located are managed by home agents 130a, 130b, respectively, and when the mobile terminals 110a, 110b move from home core networks 131 a, 131b of home agents 130a, 130b, IP packets destined for mobile terminals 110a, 110b are transferred to mobile terminals 110a, 110b by home agents 130a, 130b, which may secure migration transparency (for example, see Japanese Patent Laid-Open No. 2005-26941).

In Mobile IPv6 described above, communication between mobile terminals is provided through a home agent, further, Mobile IPv6 includes a system which optimally provides a communication pathway so that an IP packet may be exchanged between mobile terminals 110a, 110b without going through the home agent. Processing to optimally provide the communication pathway will be described hereinafter.

When an IP packet transmitted from mobile terminal 110a, as described above, is encapsulated into an IP packet having the external transmission source address of the IP address of "HA2" of home agent 130b and the external destination address of "CoA2" of mobile terminal 110b, then, a combination of the home address of "HoA2" of mobile terminal 110b and the care-of address of "CoA2" is transmitted to the mobile terminal 110a, by mobile terminal 110b, and the location registration request (BU) is made.

In mobile terminal 110a which received the location registration request (BU) from mobile terminal 110b, after its validity is confirmed, the combination of the home address of "HoA2" of mobile terminal 110b and the care-of address of "CoA2" is registered in a memory for optimally providing a route, and the location registration acknowledgement (BA) is transmitted to mobile terminal 110b.

Subsequently, when an IP packet destined for mobile terminal 110b is transmitted from mobile terminal 110a, then, an IP packet having the transmission source address of "CoA1", the destination address of "CoA2" and the "HoA1" given as a home address option is transmitted by mobile terminal 110a. This IP packet is delivered to mobile terminal 110b without going through the home agents 130a, 130b.

When an IP packet is exchanged between mobile terminals 110a, 110b by optimally providing a communication pathway in such a way, delay caused by redundancy of the communication pathway may be avoided (for example, see Japanese Patent Laid-Open No. 2005-33469).

However, in the system for optimally providing the communication pathway between mobile terminals 110a, 110b in such a way, because a communication partner is informed of care-of addresses "CoA1", "CoA2" indicating the locations where mobile terminals 110a, 110b are currently located, the communication partner can recognize the location where the mobile terminal is currently located.

Then, an edge mobility technology has been proposed that, in the communication where the communication pathway is optimally provided, an IP packet exchanged between the mobile terminals 110a, 110b is encapsulated or decapsulated by edge routers 120a, 120b (for example, see Japanese Patent Laid-Open No. 2002-271377 and No. 2004-112727). In this edge mobility technology, the location registration request (BU) to home agents 130a, 130b, creation of care-of addresses "CoA" of mobile terminals 110a, 110b and processing for optimally providing the communication pathway, as described above, are made by edge routers 120a, 120b on behalf of mobile terminals 110a, 110b.

Therefore, care-of addresses "CoA1", "CoA2" of mobile terminals 110a, 110b are not managed by mobile terminals 110a, 110b, but are managed by the edge routers 120a, 120b, and further, when an IP packet is exchanged between mobile terminals 110a, 110b through the optimized pathway described above without through home agents 130a, 130b, the care-of addresses "CoA1", "CoA2" of the mobile terminals 110a, 110b are exchanged only between edge routers 120a, 120b, thereby the care-of addresses are not sent to the communication partner, which may prevent the communication partner from recognizing the location where the mobile terminal is currently located.

In the edge mobility technology described above, while the mobile terminals are communicating with each other, if the mobile terminal moves, and if an access network in which the mobile terminal is located and the edge router by which the access network is controlled, are changed (hand over), the communication can not be kept. FIG. 2 is a view showing such a situation.

Mobile terminals MN1, MN2 exchange a packet through first communication pathway P1 denoted by a solid line in FIG. 2. Home agents HA1, HA2 manage home addresses HoA1, HoA2 and care-of addresses CoA1, CoA2 of the mobile terminals MN1, MN2, respectively. Edge routers ER1, ER2 to which the mobile terminals MN1, MN2 are connected manage home addresses and care-of addresses of a mobile terminal connected thereto and a communication partner of the mobile terminal, when communication is made by optimally providing a communication pathway.

Suppose that mobile terminal MN1 moves, and suppose that the edge router to which it is connected at this time is ER3, and the care-of address of the mobile terminal MN1 after movement is CoA3. The communication pathway provided by pathway optimization in this case is second communication pathway P2 denoted by a broken line as shown, therefore, in order to implement second communication pathway P2, it is necessary for edge router ER3 to inform edge router ER2 connected to mobile terminal MN2 which is a communication partner of mobile terminal MN1 of the new care-of address CoA3 of the mobile terminal MN1. However, because edge router ER3 does not have information about the communication partner of mobile terminal MN1, edge router ER3 may not inform edge router ER2 about the new care-of address CoA3 of mobile terminal MN1 (BU shown in FIG. 2), therefore second communication pathway P2 can not be implemented.

As for a system in which, at a hand over of the mobile terminal, information is exchanged between an edge router before movement and an edge router after movement, a system has been proposed in which the mobile terminal informs the edge routers before/after movement about addresses of the edge routers before/after movement of the mobile terminal (for example, see National Publication of International Patent Application No. 2004-533790, and Japanese Patent Laid-Open No. 2004-328762 and No. 2005-27314). By using the systems described in these documents, the edge router after movement can inquire of the edge router before movement, and second communication pathway P2 can be implemented, but because it is necessary for a network in the future to contain a wide variety of mobile terminals, it is also necessary to suppose that the addresses of the edge routers before/after movement can not be acquired from the mobile terminal. In such a case, edge router ER2 to which the communication partner MN2 is connected may not be informed of the care-of address of a new mobile terminal.

DISCLOSURE OF THE INVENTION

In the edge mobility technology described above, when any of mobile terminals communicating with each other is handed over, an edge router to which the mobile terminal is newly connected may not inform an edge router connected to the mobile terminal of a communication partner about a new care-of address of the mobile terminal, so that the communication can not continue. By using the system in which the mobile terminal informs edge routers before/after movement of the terminal about addresses of the edge routers before/after movement, the edge router after movement can inform the edge router before movement about a new care-of address of the mobile terminal, but when the addresses of the edge routers before/after movement can not be acquired from the mobile terminal, there arises a problem in which the communication partner may not be informed about the new care-of address of the mobile terminal.

The present invention was made in views of the problems that a conventional technology has, as described above, and an object of the present invention is to provide a mobile communication system and an edge router which can continue communication at a hand over of mobile terminals, even if addresses of edge routers before/after movement may not be acquired from the mobile terminals, when communication between the mobile terminals is made according to an edge mobility technology, and when a transfer control method used for them.

The mobile communication system of the present invention is a mobile communication system including a mobile terminal, an edge router to which the mobile terminal is connected, and a home agent for managing, as a group, a care-of address when the mobile terminal is connected to the edge router, and a home address of the mobile terminal, characterized in that the mobile terminal transmits the home address to the edge router, when it is connected to the edge router, the edge router manages the home address of the mobile terminal, and further the edge router, when the mobile terminal connected thereto communicates, manages a care-of address of a partner mobile terminal that corresponds to the home address, and, upon being informed about the home address by the mobile terminal, transmits, to the home agent, a CN information request command for requesting information about the communication partner of the mobile terminal including its address and the home address of the mobile terminal, and, upon receiving the CN information request command transferred from the home agent, transmits a CN information request acknowledgement command including a care-of address of the partner mobile terminal managed that corresponds to the home address included in the CN information request command, to an edge router whose address is included in the CN information request command, and, upon receiving, from another edge router, the CN information request acknowledgement command including the care-of address of the partner mobile terminal, issues a location registration request to an edge router and to a home agent shown by the care-of address of the partner mobile terminal, and, upon receiving, from the home agent, the CN information request acknowledgement command indicating that the care-of address is not managed correspondingly to the home address included in the CN information request command, issues the location registration request to the home agent, and the home agent, upon receiving the CN information request command, confirms whether the care-of address corresponds to the home address included in the CN information request command is managed, after confirming that the care-of address is managed, the home agent transfers the CN information request command to an edge router indicated by the care-of address, and when the care-of address is not managed correspondingly to the home address included in the CN information request command, the home agent returns the CN information request acknowledgement command indicating that the care-of address is not managed correspondingly to the home address included in the CN information request command, to an edge router which transmitted the CN information request command.

The edge router of the present invention is an edge router constituting a mobile communication system along with a mobile terminal and a home agent for managing, as a group, a care-of address when the mobile terminal is connected to the edge router and for managing a home address of the mobile terminal, characterized by including:

an address table which stores the home address and the care-of address of the mobile terminal, and further stores a home address and a care-of address of a partner mobile terminal that corresponds to the home address of the mobile terminal, when the mobile terminal connected thereto communicates, and an address table control function which, upon being informed by the mobile terminal about the home address, transmits, to the home agent, a CN information request command for requesting information about the communication partner of the mobile terminal including its address and the home address of the mobile terminal, and, upon receiving the CN information request command transferred from the home agent, transmits a CN information request acknowledgement command including a care-of address of the partner mobile terminal managed correspondingly to the home address included in the CN information request command, to an edge router whose address is included in the CN information request command, and, upon receiving, from another edge router, the CN information request acknowledgement command including the care-of address of the partner mobile terminal, issues a location registration request to an edge router and to a home agent indicated by the care-of address of the partner mobile terminal, and, upon receiving, from the home agent, the CN information request acknowledgement command indicating that the care-of address is not managed correspondingly to the home address included in the CN information request command, issues the location registration request to the home agent.

The transfer control method of the present invention is a transfer control method used for a mobile communication system including a mobile terminal, an edge router to which the mobile terminal is connected, and a home agent for managing, as a group, a care-of address when the mobile terminal is connected to the edge router, and a home address of the mobile terminal, characterized in that the mobile terminal transmits the home address to the edge router, when it is connected to the edge router, the edge router manages the home address of the mobile terminal, and further the edge router, when the mobile terminal connected thereto communicates, manages a care-of address of a partner mobile terminal that corresponds to the home address, and, upon being informed about the home address by the mobile terminal, transmits, to the home agent, a CN information request command for requesting information about the communication partner of the mobile terminal including its address and the home address of the mobile terminal, and, upon receiving the CN information request command transferred from the home agent, transmits a CN information request acknowledgement command including the care-of address of the partner mobile terminal managed that corresponds to the home address included in the CN information request command, to an edge router whose address is included in the CN information request command, and, upon receiving, from another edge router, the CN information request acknowledgement command including the care-of address of the partner mobile terminal, issues a location registration request to an edge router and to a home agent indicated by the care-of address of the partner mobile terminal, and, upon receiving, from the home agent, the CN information request acknowledgement command indicating that the care-of address is not managed corresponds to the home address included in the CN information request command, issues the location registration request to the home agent, and the home agent, upon receiving the CN information request command, confirms whether the care-of address is managed correspondingly to the home address included in the CN information request command, and when the care-of address is managed, the home agent transfers the CN information request command to an edge router indicated by the care-of address, and when the care-of address is not managed corresponds to the home address included in the CN information request command, the home agent returns the CN information request acknowledgement command indicating that the care-of address is not managed corresponds to the home address included in the CN information request command, to an edge router which transmitted the CN information request command.

The transfer control method of another exemplary embodiment is a transfer control method used in an edge router constituting a mobile communication system along with a mobile terminal, and a home agent for managing, as a group, a care-of address when the mobile terminal is connected to the edge router and a home address of the mobile terminal, characterized in that the edge router manages the home address of the mobile terminal, and further, the edge router, when the mobile terminal connected thereto communicates, manages a care-of address of a partner mobile terminal that corresponds to the home address, and, upon being informed about the home address by the mobile terminal, transmits, to the home agent, a CN information request command for requesting information about the communication partner of the mobile terminal including its address and the home address of the mobile terminal, and, upon receiving the CN information request command transferred from the home agent, transmits a CN information request acknowledgement command including the care-of address of the partner mobile terminal managed correspondingly to the home address included in the CN information request command, to an edge router whose address is included in the CN information request command, and, upon receiving, from another edge router, the CN information request acknowledgement command including the care-of address of the partner mobile terminal, issues a location registration request to an edge router and a home agent indicated by the care-of address of the partner mobile terminal, and, upon receiving, from the home agent, the CN information request acknowledgement command indicating that the care-of address is not managed corresponds to the home address included in the CN information request command, issues the location registration request to the home agent.

The program of the present invention is a program for implementing the method described above on a computer system, and the recording medium of the present invention stores the program.

The mobile communication system of another exemplary embodiment is a mobile communication system including: a mobile terminal transmitting its home address when it moves into a new access network; an edge router for managing a home address of the mobile terminal and a care-of address of a communication partner mobile terminal of the mobile terminal; and a home agent managing, as a group, a care-of address when the mobile terminal is connected to the edge router and a home address of the mobile terminal, characterized in that the edge router, when it does not store a care-of address of the communication partner mobile terminal of a newly connected mobile terminal, transmits, to the home agent, a CN information request command for requesting information of the communication partner of the mobile terminal including its address and the home address of the mobile terminal, and, upon receiving a CN information request acknowledgement including the care-of address of the communication partner mobile terminal, from an edge router which received the CN information request command through the home agent and to which the mobile terminal was connected before movement, issues a location registration request to an edge router and to a home agent indicated by the care-of address of the communication partner mobile terminal, and the home agent, upon receiving the CN information request command, transfers the CN information request command to an edge router about the care-of address managed correspondingly to the home address included in the CN information request command, and, upon receiving the location registration request, updates the care-of address managed correspondingly to the home address included in the location registration request.

The mobile communication system of still another exemplary embodiment is a mobile communication system including: a mobile terminal transmitting its home address when it moves into a new access network; an edge router for managing a home address of the mobile terminal and a care-of address of a communication partner mobile terminal of the mobile terminal; and a home agent managing, as a group, a care-of address when the mobile terminal is connected to the edge router and a home address of the mobile terminal, characterized by including:

a first edge router which, when the care-of address of the communication partner mobile terminal of a newly connected mobile terminal is not stored, transmits, to the home agent, a CN information request command for requesting information of the communication partner of the mobile terminal including its address that forms an edge router address after movement and the home address of the mobile terminal, and, upon receiving a CN information request acknowledgement including the care-of address of the communication partner mobile terminal, issues a location registration request to an edge router and to a home agent indicated by the care-of address of the communication partner mobile terminal, a home agent which, upon receiving the CN information request command, transfers the CN information request command to an edge router of the care-of address managed correspondingly to the home address of the mobile terminal included in the CN information request command, and, upon receiving the location registration request, updates the care-of address managed correspondingly to the home address of the mobile terminal included in the location registration request, and a second edge router which, upon receiving the CN information request command through the home agent, transmits the care-of address managed correspondingly to the home address of the mobile terminal included in the CN information request command, to an edge router indicated by the edge router address after movement included in the CN information request command, as a CN information request acknowledgement.

The mobile communication system of still another exemplary embodiment is a mobile communication system including: a mobile terminal transmitting its home address when it moves into a new access network; an edge router for managing a home address of the mobile terminal and a care-of address of a communication partner mobile terminal of the mobile terminal; and a home agent managing, as a group, a care-of address when the mobile terminal is connected to the edge router and a home address of the mobile terminal, characterized in that the edge router, when it does not store the care-of address of the communication partner mobile terminal of a mobile terminal newly connected, transmits, to the home agent, a CN information request command for requesting information about the communication partner of the mobile terminal including its address and the home address of the mobile terminal, and upon receiving, from the home agent, a CN information request acknowledgement indicating that the care-of address managed correspondingly to the home address included in the CN information request command is not present, issues a location registration request to the home agent, and the home agent, upon receiving the location registration request, registers the care-of address included in the location registration request that corresponds to the home address included in the location registration request.

The edge router of another exemplary embodiment is an edge router constituting a mobile communication system including: a mobile terminal transmitting its home address when it moves into a new access network; and a home agent for managing, as a group, a care-of address of an access network where the mobile terminal is located and a home address of the mobile terminal, characterized by including:

location management means for managing the home address of the mobile terminal and a care-of address of the mobile terminal's communication partner, location information inquiry means which transmits, to the home agent, a CN information request command for requesting information of the communication partner of the mobile terminal including its address forming an edge router address after movement and the home address of the mobile terminal, when a care-of address of the communication partner mobile terminal of a newly connected mobile terminal is not stored, location information informing means which, upon receiving the CN information request command through the home agent, transmits the care-of address managed by the location management means that corresponds to the home address of the mobile terminal included in the CN information request command, to an edge router indicated by the edge router address after movement included in the CN information request command, as a CN information request acknowledgement, and location registration means which, upon receiving the CN information request acknowledgement including the care-of address of the communication partner mobile terminal, issues the location registration request to an edge router and to the home agent indicated by the care-of address of the communication partner mobile terminal.

In this case, the location registration means, upon receiving, from the home agent, the CN information request acknowledgement indicating that the care-of address managed so as to correspond to the home address included in the CN information request command is not present, may issue the location registration request to the home agent.

In the present invention as configured above, when the mobile terminal moves so that it becomes connected to the edge router, the CN information request command is transmitted to the home agent. The home agent manages the care-of address that corresponds to the home address of the mobile terminal and transmits the CN information request command to this care-of address, and this care-of address corresponds to the edge router before the mobile terminal moves and this edge router manages the care-of address of the communication partner of the mobile terminal. Therefore, the care-of address of the communication partner of the mobile terminal can be acquired.

When communication between mobile terminals is made according to an edge mobility technology, even if edge router addresses before/after movement can not be acquired from the mobile terminal, a care-of address of a communication partner of the mobile terminal can be acquired from the edge router before the mobile terminal moves, therefore at a hand over of the mobile terminal, the communication can continue.

BRIEF DESCRIPTION OF THE DRAWINGS

FIG. 7 is a view showing contents of a packet used in the exemplary embodiment shown in FIG. 3;

FIG. 8B is a view showing one example of stored contents of address table 22 shown in FIG. 8A; and FIG. 9 is a flowchart showing operation with respect to acquisition of CN information.

DESCRIPTION OF SYMBOLS

HA1, HA2 home agent
ER1 to ER3 edge router
MN1, MN2 mobile terminal
C1 CN information request command
C2 CN information request acknowledgement
P1 first communication pathway
P2 second communication pathway

BEST MODE FOR CARRYING OUT THE INVENTION

Figure 1:
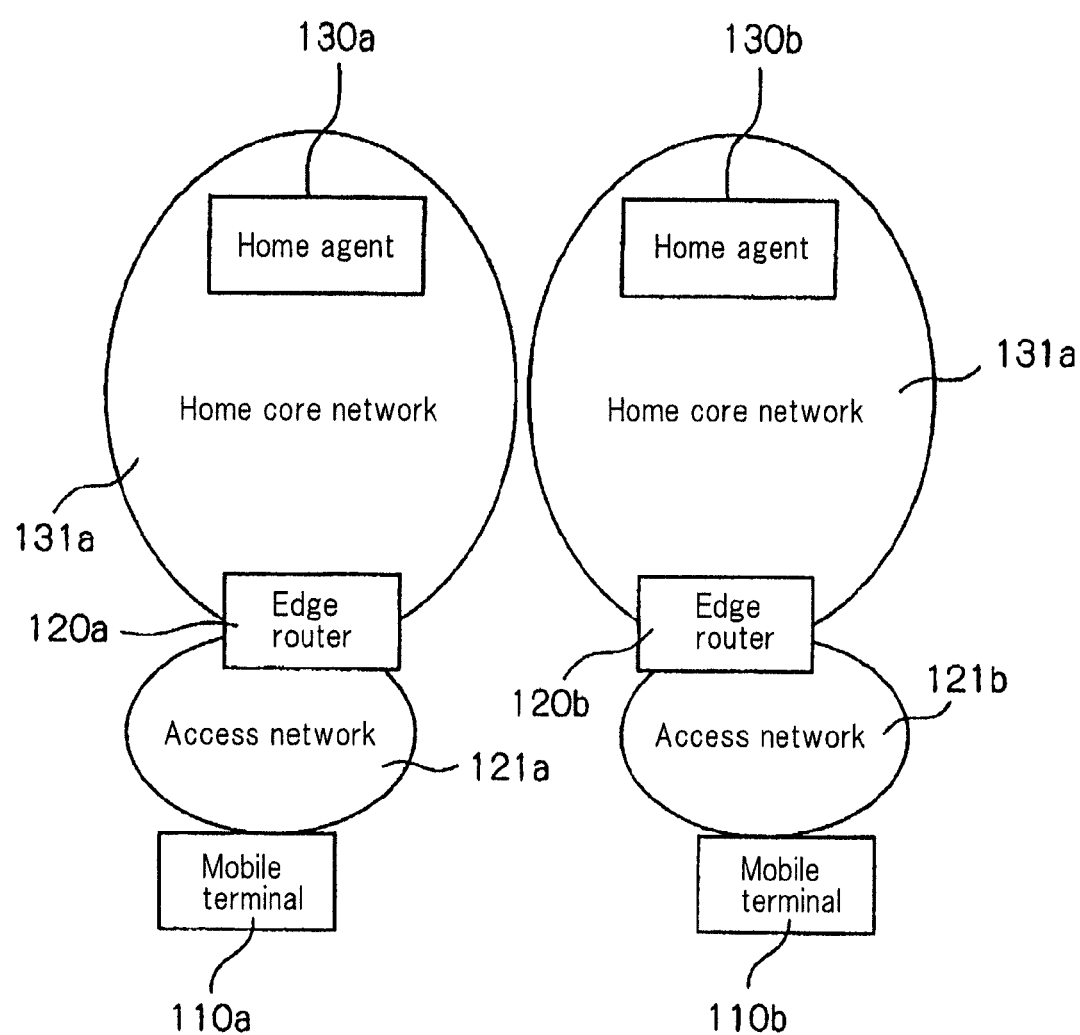
FIG. 1 is a block diagram showing a configuration and operation of a conventional example.
Figure 2:
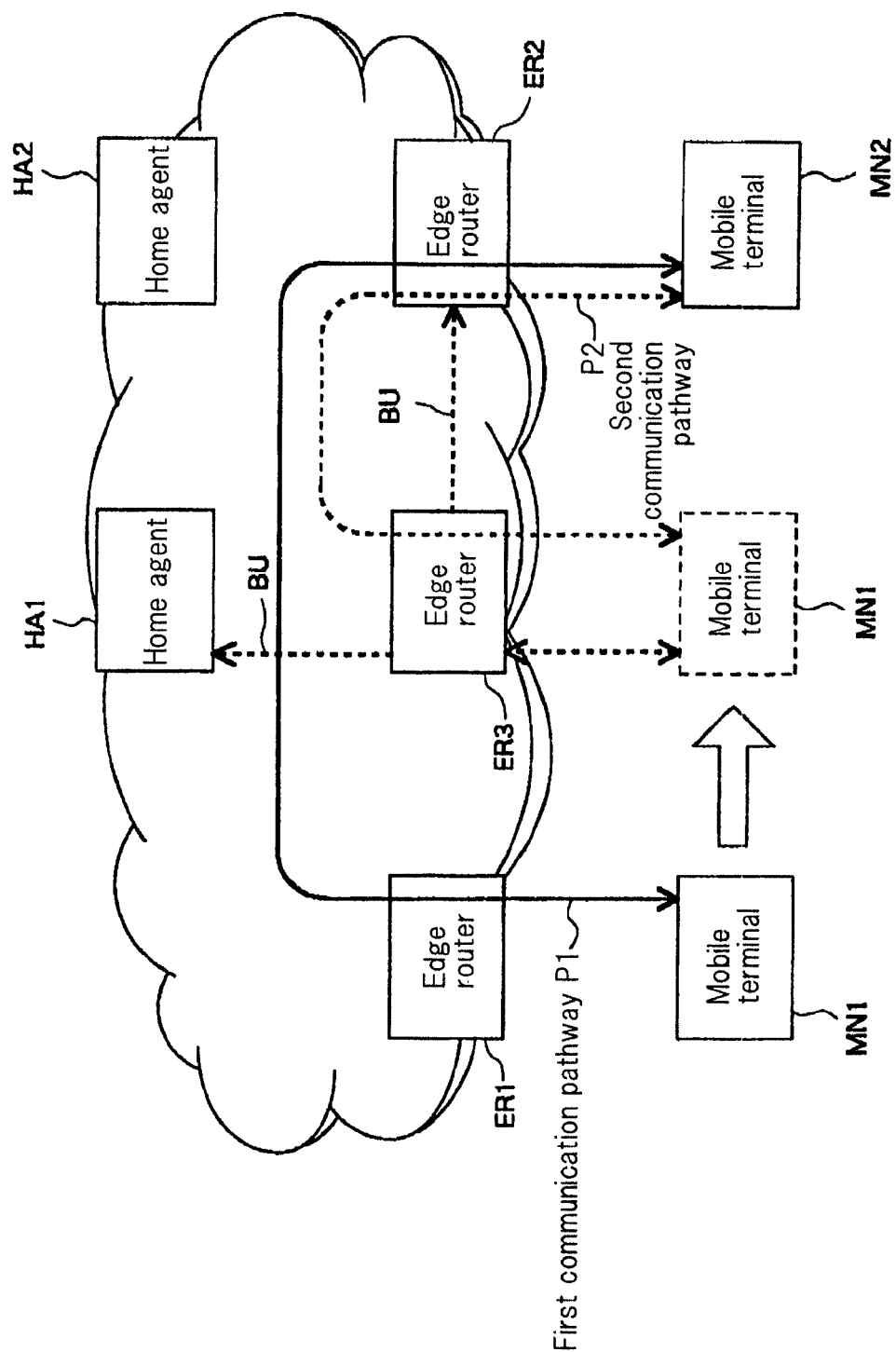
FIG. 2 is a block diagram showing a configuration and operation of a communication system of a mobile terminal according to the conventional example.
Figure 3:
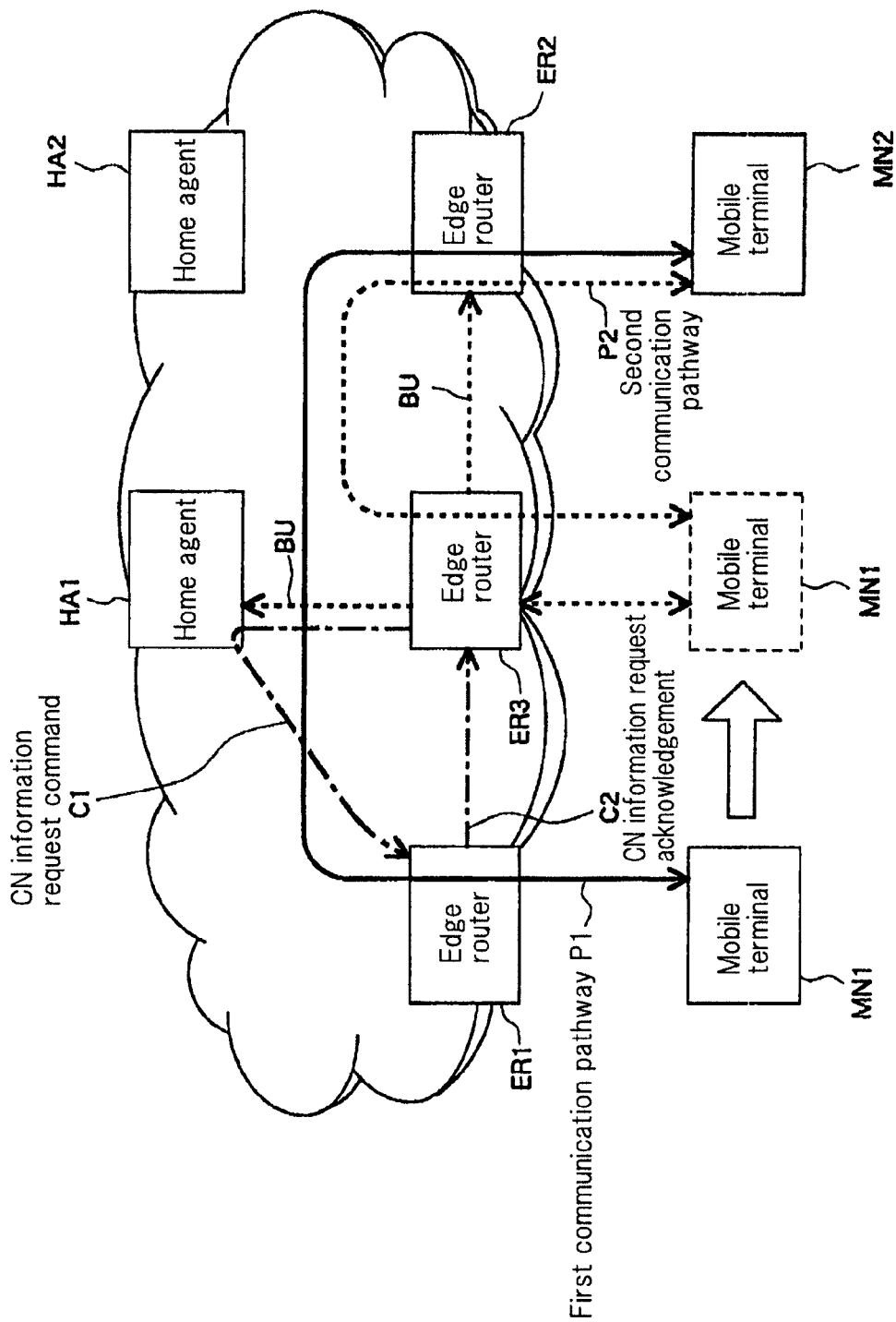
FIG. 3 is a block diagram showing a configuration and operation of one exemplary embodiment of a communication system of a mobile terminal according to the present invention.
Figure 4:
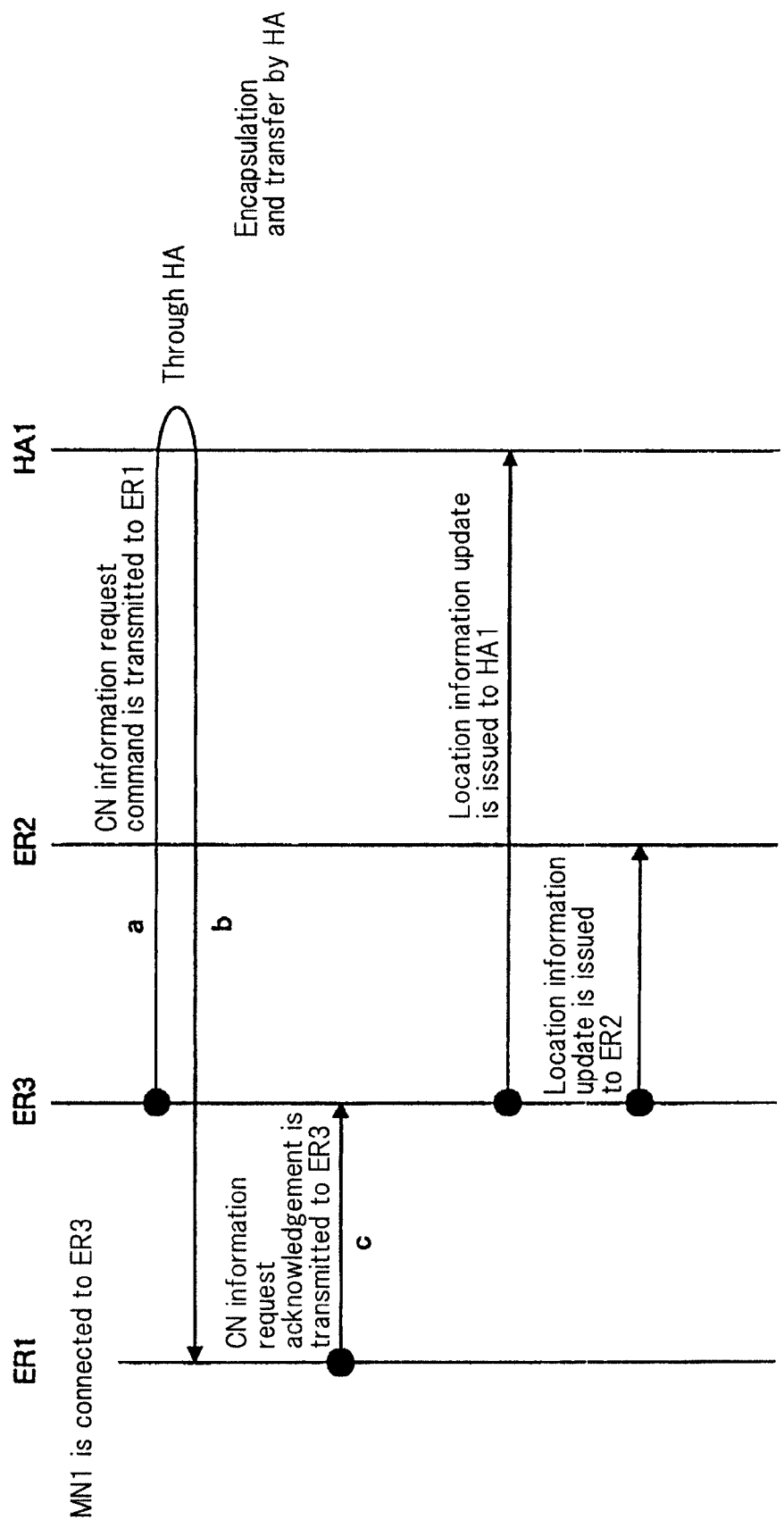
FIG. 4 is a sequence diagram showing the operation of the exemplary embodiment shown in FIG. 3.
Figure 5:
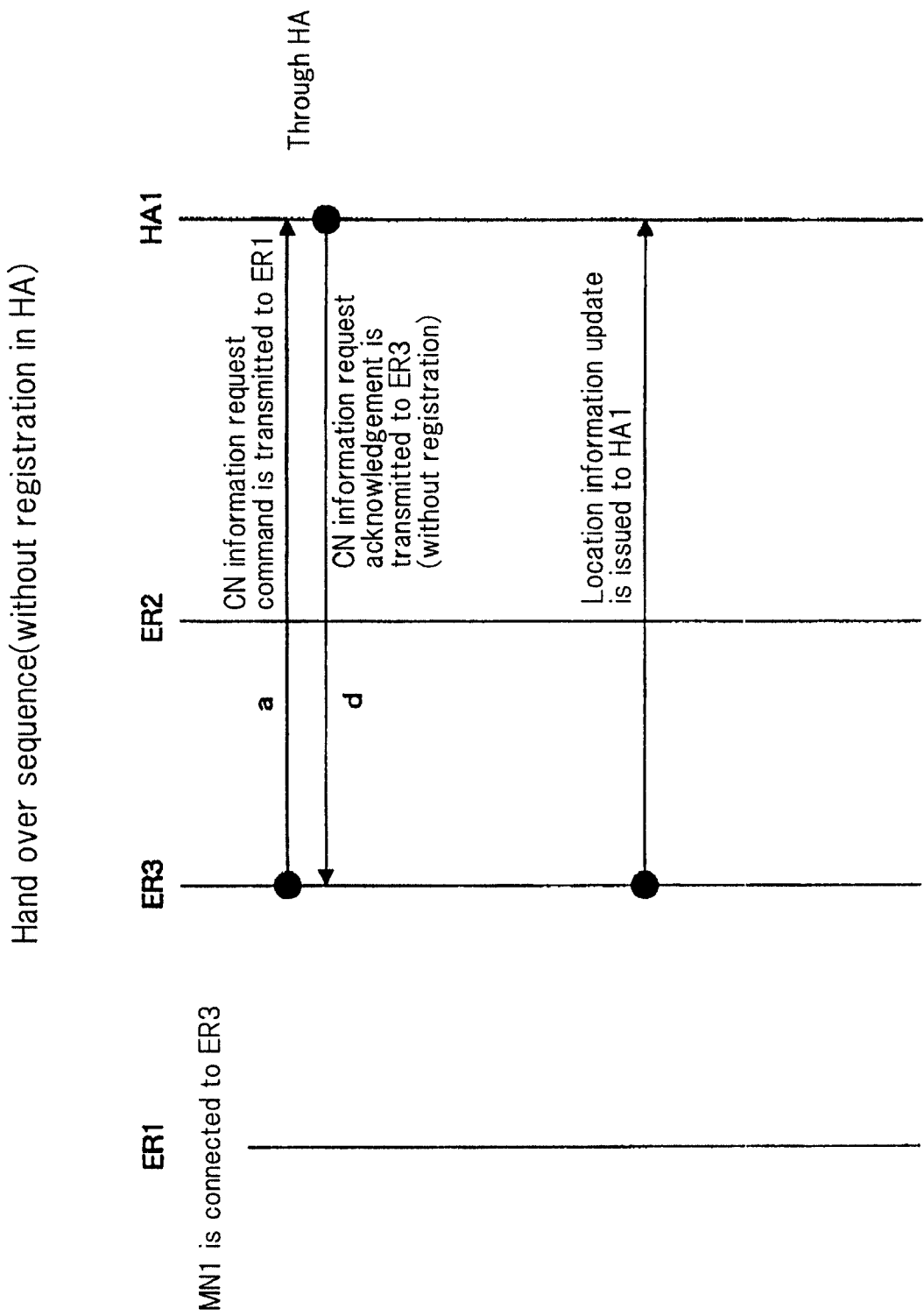
FIG. 5 is a sequence diagram showing the operation of the exemplary embodiment shown in FIG. 3.

Next, an exemplary embodiment will be described with reference to the accompanying drawings. FIG. 3 is a block diagram showing a configuration and operation of one exemplary embodiment of a communication system of a mobile terminal according to the present invention. FIGS. 4, 5 are sequence diagrams showing the operation.

Figure 6:
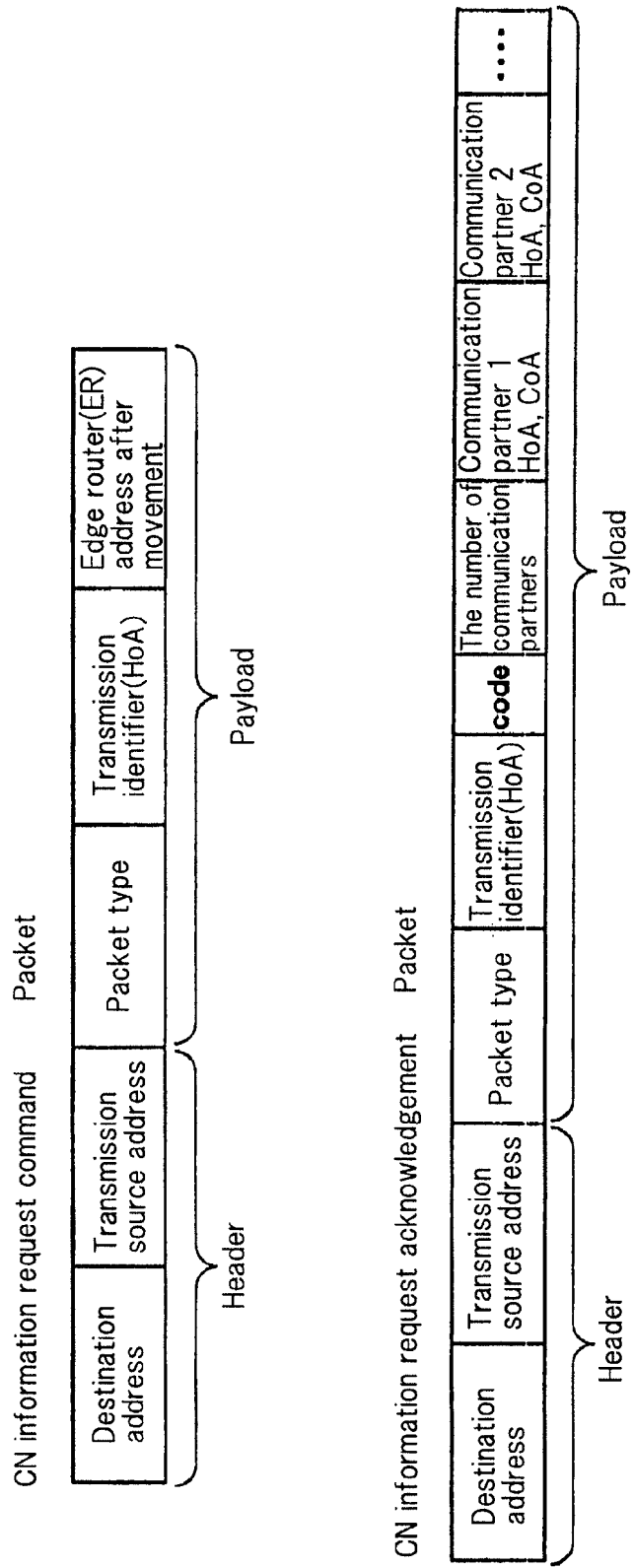
FIG. 6 is a view showing contents of a packet used in the exemplary embodiment shown in FIG. 3.
Figure 8A:
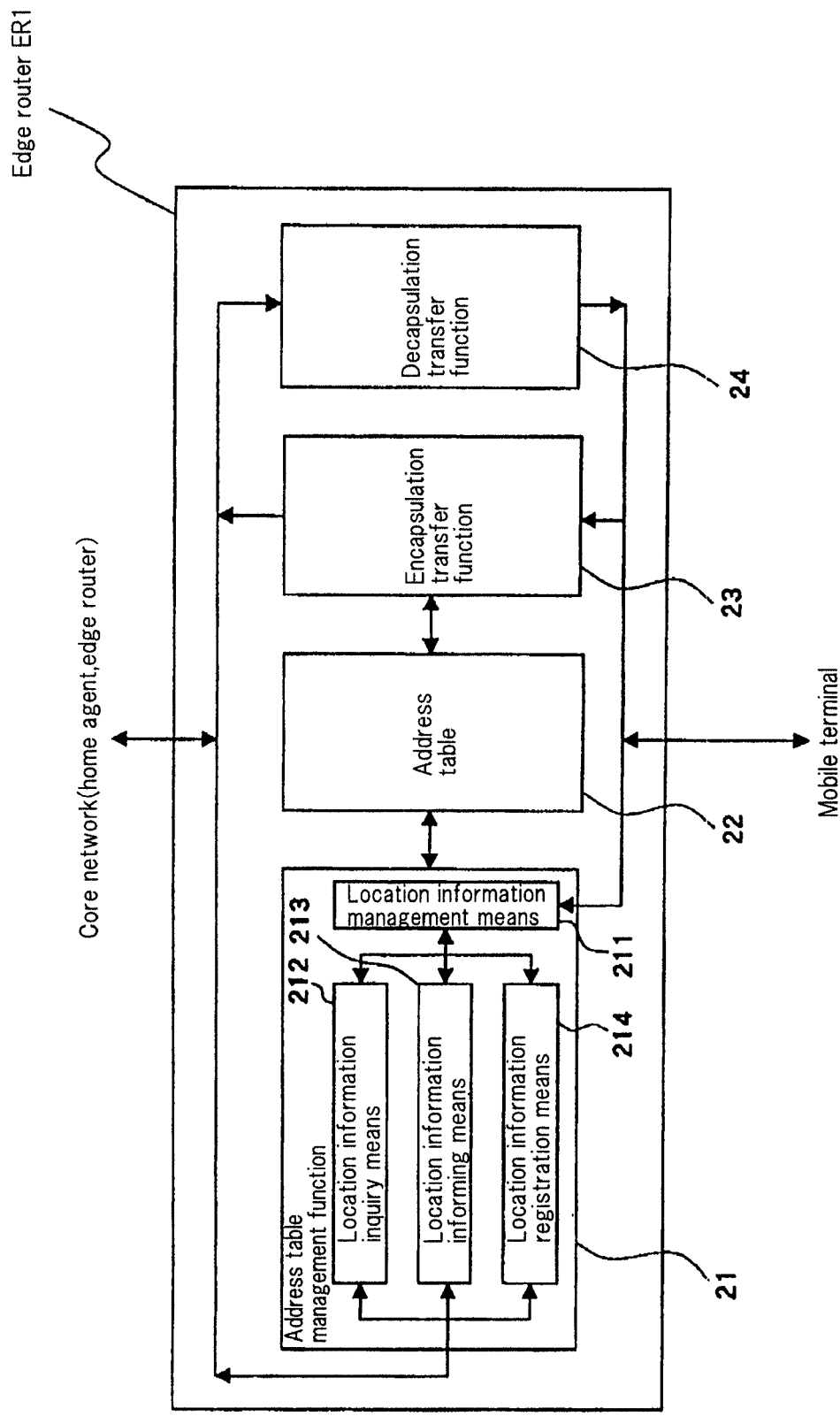
FIG. 8A is a block diagram showing a configuration of edge router ER1 shown in FIG. 3.

FIGS. 6, 7 are views showing contents of a packet used in this exemplary embodiment. FIG. 8A is a block diagram showing a configuration of edge router ER1 shown in FIG. 3. FIG. 8B is a view showing one example of stored contents of address table 22 shown in FIG. 8A. FIG. 9 is a flowchart showing operation with respect to acquisition of CN information. Edge routers ER1 to ER3 shown in FIG. 3 all have like configuration and FIG. 8 shows the configuration of edge router ER1 as representative.

First, the configuration and operation of the edge router that plays an important role in this exemplary embodiment will be described.

Edge router ER1 shown in FIG. 8A includes address table management function 21, address table 22, encapsulation transfer function 23 and decapsulation transfer function 24. Address table management function 21 includes location information management means 211, location information inquiry means 214, location information informing means 213 and location information registration means 214.

Location information management means 211 in address table management function 21 acquires a home address from a mobile terminal and assigns a care-of address. Further, it updates contents of address table 22 by acquisition of the home address from the mobile terminal, and by reception of a CN information request acknowledgement or care-of address update information from another edge router. When the care-of address of the communication partner mobile terminal of a newly connected mobile terminal is registered in the address table, location information management means 211 informs to the location information inquiry means 212.

Location information inquiry means 212 transmits, to the home agent, a CN information request command for requesting information about the communication partner of the mobile terminal including its address that forms an edge router address after movement and the home address of the mobile terminal, when the care-of address of the communication partner mobile terminal of a newly connected mobile terminal is not stored, that is, upon being informed by location information management means 211.

Location information informing means 213, upon receiving the CN information request command through the home agent, transmits the care-of address managed by location information management means 211 that corresponds to the home address of the mobile terminal included in the CN information request command using the address table, to an edge router indicated by the edge router address included in the CN information request command after movement of the mobile terminal, as the CN information request acknowledgement.

Location information registration means 214, upon receiving the CN information request acknowledgement including the care-of address of the communication partner mobile terminal, passes the information to location information management means 211, and at the same time, it issues a location registration request to an edge router and to a home agent shown by the care-of address of the communication partner mobile terminal included in the CN information request acknowledgement.

Address table 22, whose stored contents are as shown in FIG. 8B, holds a group of the home address and the care-of address of each mobile terminal connected to the edge router, and the home address and the care-of address of the communication partner with which the mobile terminal communicates.

Encapsulation transfer function 23 encapsulates an IP packet sent from each mobile terminal into an IP packet including the care-of address of the partner mobile terminal with reference to address table 22 and transfers the packet, when the mobile terminals communicate with each other.

Decapsulation transfer function 24, upon receiving the encapsulated IP packet sent from another edge router, decapsulates the IP packet and transfers it to the mobile terminal with which it communicates.

Next, the operation of this exemplary embodiment will be described.

Mobile terminals MN1, MN2 transmit and receive a packet through first communication pathway P1. Home agents HA1, HA2 manage home addresses HoA1, HoA2 and care-of addresses CoA1, CoA2 of mobile terminals MN1, MN2, respectively. Edge routers ER1, ER2 to which mobile terminals MN1, MN2 are connected respectively manage a home address and a care-of address of a connected mobile terminal, and manage a home address and a care-of address of the communication partner of the mobile terminal using address table 22, when communication is made using the pathway optimization.

Suppose that the mobile terminal MN1 moves that the edge router connected at this time is an edge router ER3, and that the care-of address of mobile terminal MN1 after movement is care-of address CoA3.

In addition, when the mobile terminal is connected to the edge router in the beginning, the address of the mobile terminal at the edge router can not be registered in the home address. Then, first, when the address of the mobile terminal at the edge router is registered in the home address, the operation will be described with reference to FIGS. 3, 4, 6, 7 and 8A.

Edge router ER3 is informed about the home address HoA1 by mobile terminal MN1, when mobile terminal MN1 moves thereto, and location information management means 211 in address table management function 21 assigns care-of address CoA3 to mobile terminal MN1. Location information management means 211 in address table management function 21 registers HoA1-CoA3 in address table 22.

Location information inquiry means 212 in address table management function 21 in edge router ER3 transmits, to edge router ER1 at acquired home address HoA1, CN information request command packet C1 to request information about mobile terminal MN2 which is a communication partner, through home agent HA1 of the mobile terminal ("a", "b" shown in FIGS. 4, 7).

FIG. 6 shows a packet format of CN information request command packet C1, and FIG. 7 shows specific contents. As shown in FIG. 6, CN information request command packet C1 includes a header having a destination address and a transmission source address, and a payload having a packet type, a terminal identifier (HoA) and an edge router (ER) address after movement of the terminal.

Specific contents of a packet (a) transmitted from edge router ER3 to home agent HA1 in CN information request command packet C1 are as shown in FIG. 7, and HoA1 which is the home address of mobile terminal MN1 as the destination address, and ER3 which is the address of edge router ER3 as the transmission source address, are described, and as the payload, a type which is the packet type indicating the CN information request command packet C1, HoA1 which is the home address of the mobile terminal MN1 as the terminal identifier, and ER3 which is the address of the edge router ER3 as the edge router address after movement, are described.

Home agent HA1, upon receiving the packet (a) described above, encapsulates the packet (a) into a packet (b) by setting care-of address CoA1, registered in a binding cache that corresponds to home address HoA1 of mobile terminal MN1, to an external destination address, and home agent HA1 to an external transmission source address, and transmits the packet (b) to edge router ER1.

Edge router ER1 confirms the type of received packet, and when it is CN information request command packet C1, edge router ER1 removes it to pass the packet (b) to address table management function 21. Location information informing means 213 in address table management function 21, by making location information management means 211 search address table 22 to acquire information of home address HoA1 in the CN information request command, acquires CN information of home address HoA1, and creates CN information request acknowledgement packet C2 based on the CN information and transmits it to edge router ER3 after movement of the terminal ("c" shown in FIGS. 4, 7).

A packet format of CN information request acknowledgement packet C2 includes, as shown in FIG. 6, a header having a destination address and a transmission source address, and a payload having a packet type, a terminal identifier (HoA), a code indicating the CN information request acknowledgement sent from the edge router before movement of the terminal, the number of communication partners, the home address HoA and the care-of address CoA of the communication partners. Specific contents of a packet (c) transmitted from edge router ER1 to edge router ER3 are as shown in FIG. 7, and ER3 which is the address of edge router ER3 as the destination address, and ER1 which is the address of edge router ER1 as the transmission source address are described, and as the payload, a type which is the packet type indicating CN information request acknowledgement packet C2, HoA1 which is the home address of mobile terminal MN1 as the terminal identifier, a code indicating the CN information request acknowledgement sent by the edge router before movement of the terminal, 1 as the number of communication partners, and home address HoA2 and care-of address CoA2 of mobile terminal MN2 which is a communication partner, are described.

Edge router ER3 after movement of the terminal, upon receiving CN information request acknowledgement packet C2 from edge router ER1 before movement, passes it to location information registration means 214 in address table management function 21. Location information registration means 214 in address table management function 21 writes CN information in the CN information request acknowledgement packet into address table 22 through location information management means 211. Subsequently, location information registration means 214 in address table management function 21 issues a location registration request (BU) of "HA1" to the home agent, and provides that the care-of address be updated from CoA1 to CoA3. Further, location information registration means 214 in address table management function 21 acquires the address of edge router ER2 where the mobile terminal MN2 is located, which is a partner terminal (CN), from CN information request acknowledgement packet C2 sent from edge router ER1 before movement of the terminal, issues the location registration request (BU) to the edge router ER2 to which the mobile terminal MN2 is connected, and provides that the care-of address be updated from CoA1 to CoA3.

The update in the way described above allows a packet destined for mobile terminal MN1 to be delivered from edge router ER1 before movement of the terminal, to the edge router ER3 after movement of the terminal, and mobile terminals MN1, MN2 will transmit/receive a packet to/from each other through second communication pathway P2.

Next, the operation will be described with reference to FIGS. 5, 7, when the address of the mobile terminal at the edge router is not registered in the home address.

When the mobile terminal is connected to the edge router in the beginning, the address of the mobile terminal at the edge router may not be present in the home address (in the binding cache (BC) in the home agent, information such as HoA-none is stored).

In such circumstances, when edge router ER3 acquires home address HoA1 from the mobile terminal MN1 which moved thereto, location information management means 211 in address table management function 21 in edge router ER3 assigns care-of address CoA3 to mobile terminal MN1. Location information management means 211 in address table management function 21 registers HoA1-CoA3 in address table 22. Then it informs location information inquiry means 212.

Location information inquiry means 212 that has been informed in address table management function 21 transmits the CN information request command packet C1 in order to request information about mobile terminal MN2 which is a communication partner, to edge router ER1 at acquired home address HoA1, through home agent HA1 of the mobile terminal ("a" shown in FIGS. 5, 7).

Home agent HA1, upon receiving the packet (a) described above, informs the edge router ER3, as CN information request acknowledgement, that the registration has not been made, because the care-of address corresponding to home address HoA1 of mobile terminal MN1 is not present ("d" shown in FIGS. 5, 7). Specific contents of a packet (d) transmitted from home agent HA1 to edge router ER3 are as shown in FIG. 7, and ER3 which is the address of edge router ER3 as the destination address, and HA1 which is the address of home agent HA1 as the transmission source address are described, and as the payload, a type which is the packet type indicating the CN information request acknowledgement packet, HoA1 which is the home address of mobile terminal MN1 as the terminal identifier, and a code indicating that the address of the mobile terminal at the edge router is not present in the home address, are described.

Edge router ER3, upon receiving the CN information request acknowledgement described above from home agent HA1, transfers this CN information request acknowledgement packet to location information registration means 214 in address table management function 21. Location information registration means 214 in address table management function 21 recognizes that connected mobile terminal MN1 is initially registered and not in communication, based on the contents of this CN information request acknowledgement, and issues the location registration request (BU) to home agent HA1 and provides that the care-of address be updated from CoA1 to CoA3.

Next, the operation for acquiring the CN information in the edge router will be described with reference to FIG. 9.

First, confirmation of reception of a packet is made (step S701), and when received, its type is confirmed (step S702). When it is confirmed that the type of the received packet is a home address notice from the mobile terminal (step S703), a CN information command is transmitted (step S704) and the routine return to step S701.

As the result of step S702, after it is confirmed that the type of the received packet is the CN information request command from another edge router (step S705), the CN information request acknowledgement is transmitted to an edge router which will transmit the CN information request command (step S706), and the routine return to step S701.

As the result of step S702, after it is confirmed that the type of the received packet is the CN information request acknowledgement from another edge router (step S707), the location information update is transmitted to an edge router and a home agent to which a CN shown by the CN information request acknowledgement is connected (step S708), and the routine return to step S701.

As the result of step S702, after it is confirmed that the type of the received packet is the CN information request acknowledgement from another home agent (step S709), the location information update is transmitted to the home agent (step S710), and the routine return to step S701.

In addition, edge routers ER1 to ER3, and home agents HA1, HA2 include a general computer system including an input device, an output device, a memory storage and a control device, and the present invention includes a program for implementing the operation performed by the edge routers and the home agents described in the exemplary embodiments on the computer system, and also a recording medium for storing the program.

The invention claimed is:

1. A mobile communication system including a first mobile terminal, a current edge router to which the first mobile terminal is connected, and a first home agent for managing, as a group, a first care-of address when the first mobile terminal is connected to the current edge router and a first home address of the first mobile terminal, wherein the first mobile terminal transmits the first home address to the current edge router, when the first mobile terminal is connected to the current edge router, the current edge router manages the first home address of the first mobile terminal, and when the first mobile terminal connected to the current edge router communicates with a second mobile terminal, the current edge router manages a second care-of address of the second mobile terminal corresponding to a second home address, and upon being informed of the second home address by the second mobile terminal, transmits, to the first home agent, a CN information request command for requesting information of the second mobile terminal including the second care-of-address and the second home address of the second mobile terminal, the first home agent, upon receiving the CN information request command, transfers the CN information request command to a previous edge router; and when the previous edge router receives the CN information request command transferred from the first home agent, the previous edger router transmits a CN information request acknowledgement command including the second care-of address of the second mobile terminal managed corresponding to the first home address included in the CN information request command, to the current edge router, and, when the current edge router receives the CN information request acknowledgement command from the previous edge router including the second care-of address of the second mobile terminal, the current edge router issues a location registration request to the first home agent.

2. The mobile communication system according to claim 1, wherein the first home agent, upon receiving the CN information request command, confirms whether the second care-of address is managed correspondingly to the second home address included in the CN information request command, and when the second care-of address is not managed correspondingly to the second home address included in the CN information request command, the second home agent returns, to the current edge router, the CN information request acknowledgement command indicating that the second care-of address is not managed correspondingly to the second home address included in the CN information request command, and the current edge router, upon receiving, from the first home agent, the CN information request acknowledgement command indicating that the second care-of address is not managed correspondingly to the second home address included in the CN information request command, issues a location registration request to the first home agent.

3. An edge router for a mobile communication system along with a first mobile terminal and a first home agent for managing, as a group, a first care-of address when the first mobile terminal is connected to the edge router and a first home address of the first mobile terminal, the edge router comprising:

an address table which stores the first home address and the first care-of address of the first mobile terminal, and further stores a second home address and a second care-of address of a second mobile terminal which communicates with the first mobile terminal, and an address table control function which, upon being informed of the first home address by the first mobile terminal, transmits, to the first home agent, an outgoing CN information request command for requesting information about the second mobile terminal including the second care-of-address and the second home address of the second mobile terminal, and, upon receiving an incoming CN information request command transferred from the first home agent, transmits an outgoing CN information request acknowledgement command including the first care-of address of the first mobile terminal managed correspondingly to the first home address included in the CN information request command, to another edge router whose address is included in the CN information request command, and, upon receiving, from another edge router, an incoming CN information request acknowledgement command including the second care-of address of the second mobile terminal, issues a location registration request to the first home agent.

4. The edge router according to claim 3, wherein the address table management function, upon receiving the incoming CN information request acknowledgement command indicating that the second care-of address is not managed correspondingly to the second home address included in the outgoing CN information request command, issues the location registration request to the first home agent.

5. A transfer control method used for a mobile communication system including a first mobile terminal, a current edge router to which the first mobile terminal is connected and a first home agent for managing, as a group, a first care-of address when the first mobile terminal is connected to the current edge router, and a first home address of the first mobile terminal, wherein the first mobile terminal transmits the first home address to the current edge router, when it is connected to the current edge router, the current edge router manages the first home address of the first mobile terminal, and further when the first mobile terminal connected to the current edge router communicates with a second mobile terminal, the current edge router manages a second care-of address of the second mobile terminal, and, upon being informed of the second home address by the second mobile terminal, transmits, to the first home agent, a CN information request command for requesting information about the second mobile terminal including the second care-of-address and the second home address of the second mobile terminal, the first home agent, upon receiving the CN information request command, transfers the CN information request command to a previous edge router, and when the previous edge router receives the CN information request command transferred from the first home agent, the previous edge router transmits a CN information request acknowledgement command including the second care-of address of the second mobile terminal to the current edge router, and, when the current edge router receives the CN information request acknowledgement command from the previous edge router including the second care-of address of the second mobile terminal, the current edge router issues a location registration request to the first home agent indicated by the second care-of address of the second mobile terminal.

6. The transfer control method according to claim 5, wherein
the first home agent, upon receiving the CN information request command, confirms whether the second care-of address is managed correspondingly to the second home address included in the CN information request command, and when the second care-of address is not managed correspondingly to the second home address included in the CN information request command, the first home agent returns, to the current edge router, a CN information request acknowledgement command indicating that the second care-of address is not managed correspondingly to the second home address included in the CN information request command, to the current edge router which transmitted the CN information request command, and
the current edge router, upon receiving, from the first home agent, the CN information request acknowledgement command indicating that the second care-of address is not managed correspondingly to the second home address included in the CN information request command, issues the location registration request to the first home agent.

7. A transfer control method of a mobile communication system including a first mobile terminal, a current edge router to which the first mobile terminal is connected and a first home agent for managing, as a group, a first care-of address when the first mobile terminal is connected to the current edge router, and a first home address of the first mobile terminal, used in the current edge router, wherein
the current edge router manages the first home address of the first mobile terminal, and further when the first mobile terminal connected to the current edge router communicates with a second mobile terminal, the current edge router manages a second care-of address of the second mobile terminal, and, upon being informed of the second home address by the second mobile terminal, transmits, to the first home agent, a CN information request command for requesting information about the second mobile terminal including the second care-of-address and the second home address of the second mobile terminal,
the first home agent, upon receiving the CN information request command, transfers the CN information request command to a previous edge router, and
when the previous edge router receives the CN information request command transferred from the first home agent, the previous edge router transmits a CN information request acknowledgement command including the second care-of address of the second mobile terminal managed correspondingly to the first home address included in the CN information request command, to the current edge router, and, when the current edge router receives the CN information request acknowledgement command including the second care-of address of the second mobile terminal, the current edge router issues a location registration request to the first home agent.

8. The transfer control method according to claim 7, wherein
the current edge router, upon receiving, from the first home agent, the CN information request acknowledgement command indicating that the second care-of address is not managed correspondingly to the second home address included in the CN information request command, issues the location registration request to the first home agent.

9. A non-transitory computer readable medium which includes program instructions which are executed by a computer to implement a method of a mobile communication system comprising a first mobile terminal, a current edge router to which the first mobile terminal is connected and a first home agent for managing, as a group, a first care-of address when the first mobile terminal is connected to the current edge router, and a first home address of the first mobile terminal, used in the current edge router, wherein
the current edge router manages the first home address of the first mobile terminal, and further when the first mobile terminal connected to the current edge router communicates with a second mobile terminal, the current edge router manages a second care-of address of the second mobile terminal, and, upon being informed of the second home address by the second mobile terminal, transmits, to the first home agent, a CN information request command for requesting information about the second mobile terminal including the second care-of-address and the second home address of the second mobile terminal,
the first home agent, upon receiving the CN information request command, transfers the CN information request command to a previous edge router, and
when the previous edge router receives the CN information request command transferred from the first home agent, the previous edge router transmits a CN information request acknowledgement command including the second care-of address of the second mobile terminal managed correspondingly to the first home address included in the CN information request command, to the current edge router, and, when the current edge router receives the CN information request acknowledgement command including the second care-of address of the second mobile terminal, the current edge router issues a location registration request to the first home agent.

10. A non-transitory recording medium in which a program is stored, wherein the program implements a method of a mobile communication system comprising a first mobile terminal, a current edge router to which the first mobile terminal is connected and a first home agent for managing, as a group, a first care-of address when the first mobile terminal is connected to the current edge router, and a first home address of the first mobile terminal, used in the current edge router, wherein
the current edge router manages the first home address of the first mobile terminal, and further when the first mobile terminal connected to the current edge router communicates with a second mobile terminal, the current edge router manages a second care-of address of the second mobile terminal, and, upon being informed of the second home address by the second mobile terminal, transmits, to the first home agent, a CN information request command for requesting information about the second mobile terminal including the second care-of-address and the second home address of the second mobile terminal,
the first home agent, upon receiving the CN information request command, transfers the CN information request command to a previous edge router, and
when the previous edge router receives the CN information request command transferred from the first home agent, the previous edge router transmits a CN information request acknowledgement command including the second care-of address of the second mobile terminal managed correspondingly to the first home address included in the CN information request command, to the current edge router, and, when the current edge router receives the CN information request acknowledgement command including the second care-of address of the second mobile terminal, the current edge router issues a location registration request to the first home agent.

11. A mobile communication system including: a first mobile terminal transmitting a first home address of the first mobile terminal when the first mobile terminal moves into a new access network; a current edge router for managing the first home address of the first mobile terminal and a second care-of address of a second mobile terminal which communicates with the first mobile terminal; and a first home agent managing, as a group, a first care-of address when the first mobile terminal is connected to the current edge router, and the first home address of the first mobile terminal, wherein the current edge router, when the second care-of address of the second mobile terminal of the second mobile terminal is not stored, transmits, to the first home agent, a CN information request command for requesting information about the second mobile terminal including the second care-of-address and the second home address of the second mobile terminal, and, upon receiving a CN information request acknowledgement including the second care-of address of the second mobile terminal, from a previous edge router which received the CN information request command through the first home agent and to which the first mobile terminal was connected before the first mobile terminal moved to the current edge router, issues a location registration request to a partner edge router and to a second home agent indicated by the second care-of address of the second mobile terminal, and the first home agent, upon receiving the CN information request command, transfers the CN information request command to the partner edge router of the second care-of address managed correspondingly to the first home address included in the CN information request command, and, upon receiving the location registration request, updates the first care-of address managed correspondingly to the first home address included in the location registration request.

12. A mobile communication system including: a first mobile terminal transmitting a first home address when the first mobile terminal moves into a new access network; a current edge router for managing the first home address of the first mobile terminal and a second care-of address of a second mobile terminal which communicates with the first mobile terminal; and a first home agent for managing, as a group, a first care-of address when the first mobile terminal is connected to the current edge router, and the first home address of the first mobile terminal, wherein:

a current edge router, when the second care-of address of the second mobile terminal is not stored, transmits, to the first home agent, a CN information request command for requesting information about the second mobile terminal including the second care-of-address forming an edge router address after the first mobile terminal has moved and the first home address of the first mobile terminal, and, upon receiving a CN information request acknowledgement including the second care-of address of the second mobile terminal, issues a location registration request to a partner edge router and to a second home agent indicated by the second care-of address of the second mobile terminal, the first home agent, upon receiving the CN information request command, transfers the CN information request command to the partner edge router of the second care-of address managed correspondingly to the second home address of the second mobile terminal included in the CN information request command, and, upon receiving the location registration request, updates the second care-of address managed correspondingly to the second home address of the second mobile terminal included in the location registration request, and the partner edge router, upon receiving the CN information request command through the first home agent, transmits the second care-of address managed correspondingly to the second home address of the second mobile terminal included in the CN information request command, to the current edge router indicated by the edge router address after movement included in the CN information request command, as a CN information request acknowledgement.

13. A mobile communication system including: a first mobile terminal transmitting a first home address when the first mobile terminal moves into a new access network; a current edge router for managing the first home address of the first mobile terminal and a second care-of address of a second mobile terminal which communicates with the first mobile terminal; and a first home agent managing, as a group, a first care-of address when the first mobile terminal is connected to the current edge router, and a first home address of the first mobile terminal, wherein:

the current edge router, when the second care-of address of the second mobile terminal is not stored, transmits, to the first home agent, a CN information request command for requesting information about the second mobile terminal including the second care-of-address and the second home address of the second mobile terminal, and, upon receiving, from the first home agent, a CN information request acknowledgement indicating that the second care-of address managed correspondingly to the second home address included in the CN information request command is not present, issues a location registration request to the first home agent, and the first home agent, upon receiving the location registration request, registers the second care-of address included in the location registration request, correspondingly to the second home address included in the location registration request.

14. An edge router for a mobile communication system including: a first mobile terminal transmitting a first home address when the first mobile terminal moves into a new access network; and a first home agent for managing, as a group, a first care-of address of an access network where the first mobile terminal is located, and a first home address of the first mobile terminal, the edge router comprising:

a location management means for managing the first home address of the first mobile terminal and a second care-of address of a second mobile terminal which communicates with the first mobile terminal, a location information inquiry means which, when the second care-of address of the second mobile terminal is not stored, transmits, to the first home agent, a CN information request command for requesting information about the second mobile terminal including the second care-of-address forming an edge router address after movement and the second home address of the second mobile terminal, a location information informing means which, upon receiving the CN information request command through the first home agent, transmits the second care-of address, managed by the location management means to corresponds to the second home address of the second mobile terminal included in the CN information request command, to a previous edge router indicated by the edge router address after movement included in the CN information request command, as a CN information request acknowledgement, and a location registration means which, upon receiving the CN information request acknowledgement including the second care-of address of the second mobile terminal, issues a location registration request to the first home agent.

15. The edge router according to claim 14, wherein
the location registration means, upon receiving, from the first home agent, the CN information request acknowledgement indicating that the second care-of address, managed to correspond to the second home address included in the CN information request command, is not present, issues the location registration request to the first home agent.

* * * * *